United States Patent [19]

Fukushima et al.

[11] Patent Number: 4,893,185

[45] Date of Patent: Jan. 9, 1990

[54] IMAGE SENSING APPARATUS

[75] Inventors: Nobuo Fukushima; Makoto Kondo, both of Kanagawa, Japan

[73] Assignee: Canon Kabushiki Kaisha, Tokyo, Japan

[21] Appl. No.: 352,605

[22] Filed: May 13, 1989

Related U.S. Application Data

[63] Continuation of Ser. No. 100,594, Sep. 24, 1987, abandoned.

[30] Foreign Application Priority Data

Sep. 30, 1986 [JP] Japan .................................. 61-232019

[51] Int. Cl.⁴ ................................................ H04N 3/14
[52] U.S. Cl. ................................ 358/213.17; 358/163; 358/213.18
[58] Field of Search ..................... 358/213.15, 213.17, 358/213.18, 167, 163

[56] References Cited

U.S. PATENT DOCUMENTS

| | | | |
|---|---|---|---|
| 4,167,754 | 9/1979 | Nagumo et al. | 358/213.17 |
| 4,392,157 | 7/1983 | Garcia et al. | 358/213.18 |
| 4,400,734 | 8/1983 | Davy | 358/213.17 |
| 4,524,390 | 6/1985 | Lemke | 358/213.17 |
| 4,600,946 | 7/1986 | Levine | 358/213.17 |
| 4,628,352 | 12/1986 | Boue | 358/213.15 |
| 4,654,714 | 3/1987 | Hurst et al. | 358/213.17 |
| 4,703,442 | 10/1987 | Levine | 358/163 |
| 4,739,495 | 4/1988 | Levine | 358/213.17 |

*Primary Examiner*—Jin F. Ng
*Assistant Examiner*—Stephen Brinich
*Attorney, Agent, or Firm*—Robin, Blecker, Daley & Driscoll

[57] ABSTRACT

An image sensing apparatus wherein a memory is arranged to store the whole of data representing the positions of all defects existing in an image sensor. A cyclic register is arranged to received from the memory and temporarily store the data representing the positions of a plurality of defects. A comparator compares the scanning position of the image sensor with the defect position data stored by the register, and a correction circuit corrects the output of the image sensor according to the output of the comparator.

10 Claims, 3 Drawing Sheets

IMAGE SENSING APPARATUS

This application is a continuation of application Ser. No. 100,594, filed Sept. 24, 1987, now abandoned.

BACKGROUND OF THE INVENTION

1. Field of the Invention

This invention relates to an image sensing apparatus using a solid-state image sensor and more particularly to an image sensing apparatus which is arranged such that, in cases where some of the picture elements of the solid-state image sensor is defective due to a flaw or the like, the defect is compensated for by making the defective picture element part inconspicuous.

2. Description of the Related Art

FIG. 1 of the accompanying drawings shows in a block diagram an electronic camera using a solid-state image sensor (hereinafter referred to as CCD). A control circuit 212 includes a CPU which is arranged to control a shutter stop 2 according to the luminance value of a photographing object obtained by a light measuring circuit 13. Then, an image of the object which comes through a lens 1 is projected on the CCD 3. In this instance, the CCD 3 is driven by a driving circuit 10 on the basis of timing pulses generated by a clock pulse generating circuit 11 under the control of the control circuit 212. The driving circuit 10 thus drives the CCD 3 to accumulate the projected image in the form of an electric charge. The accumulated electric charge is read out and sampled by a sample-and-hold circuit 14. The sampled electric charge is converted into a continuous signal and is supplied to a signal processing circuit 4. The signal processing circuit 4 processes the continuous signal to convert it into a video signal. The output of the circuit 4 is then modulated at a recording circuit 5 into a recordable signal form. The signal thus modulated is recorded via a magnetic head 6 on a magnetic sheet 7 which is rotated under the control of a serve circuit 9 and a motor 8.

It is of course desirable that the solid-state image sensor has no defective picture element. However, in the manufacture of the image sensor, the required number of picture elements, the size of an image plane, etc. lower the yield and increase the cost of manufacture. Meanwhile, the manufacturing problem results in some defective element that comes to show a white spot in its corresponding part on the image plane. Such a defective part is not usable as it is and necessitates interpolation with something like a signal portion obtained from a picture element adjacent to the part in question. However, such an interpolating arrangement has presented a problem in terms of practicability as it increases the scale of circuitry arrangement.

SUMMARY OF THE INVENTION

It is a principal object of this invention to provide an image sensing apparatus which is capable of compensating for the above stated defect with simple arrangement.

To attain this object, an image sensing apparatus according to this invention comprises a memory which is arranged to store the whole of defect position data covering the positions of all defects existing in an image sensor; a cyclic register which is arranged to temporarily store a plurality of defect position data stored by the memory; a comparator which is arranged to compare one of the defect position data stored by the register with the scanning position of the image sensor; and correcting means for correcting the output of the image sensor according to the output of the comparator. Such being the arrangement, the embodiment is capable of speedily comparing a plurality of defect position data by means of a single comparator. Therefore, even in the event of a slow operating speed of a micro-computer used for control, a plurality of defective picture element signals can be smoothly corrected.

It should be noted that the defect position data according to the present invention may be data representing a position one picture element before the defect position of the image sensor.

The above and other objects and features of the invention will become apparent from the following detailed description of an embodiment thereof taken in connection with the accompanying drawings.

DETAILED DESCRIPTION OF THE PREFERRED EMBODIMENT

Figure 1:
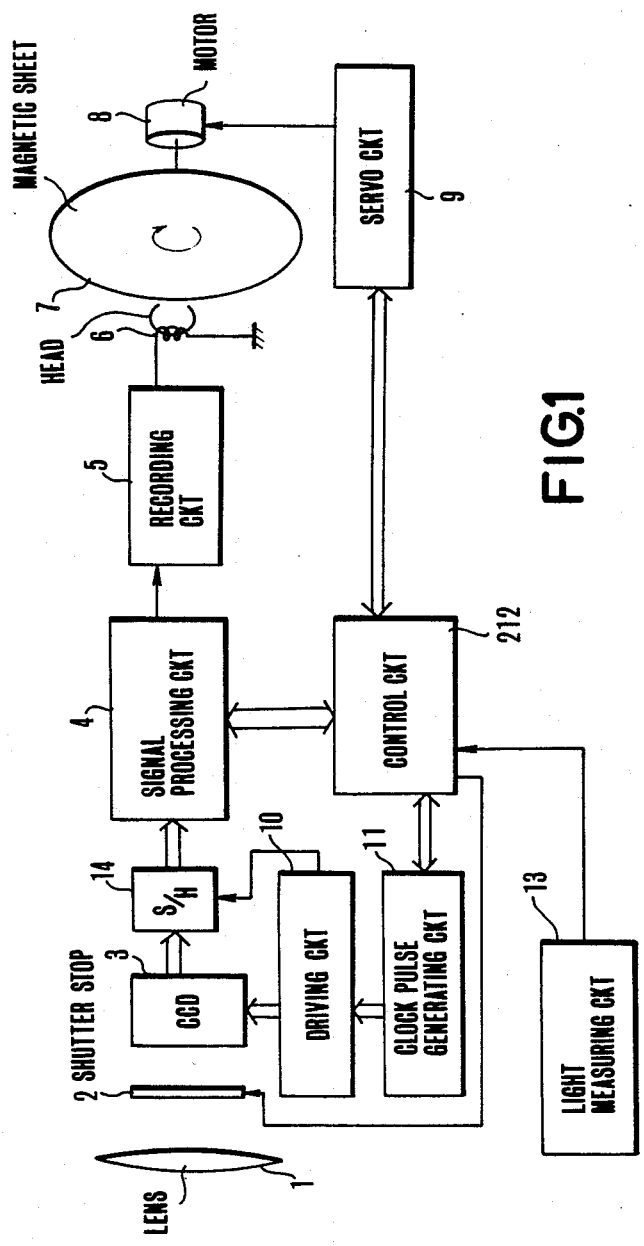
FIG. 1 is a block diagram showing the arrangement of the conventional electronic camera.
Figure 2:
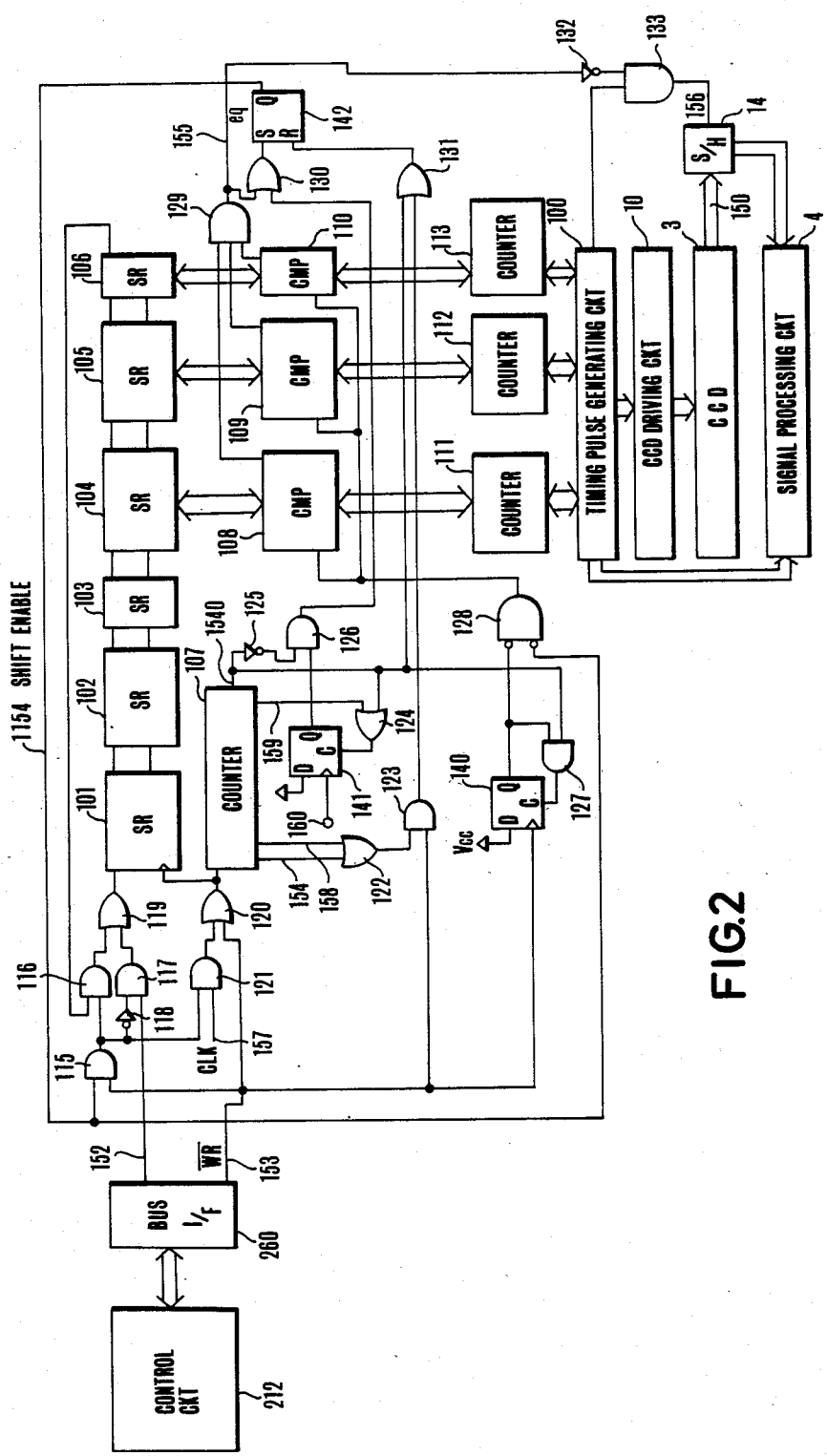
FIG. 2 is a circuit diagram, showing an embodiment of this invention.
Figure 3A:
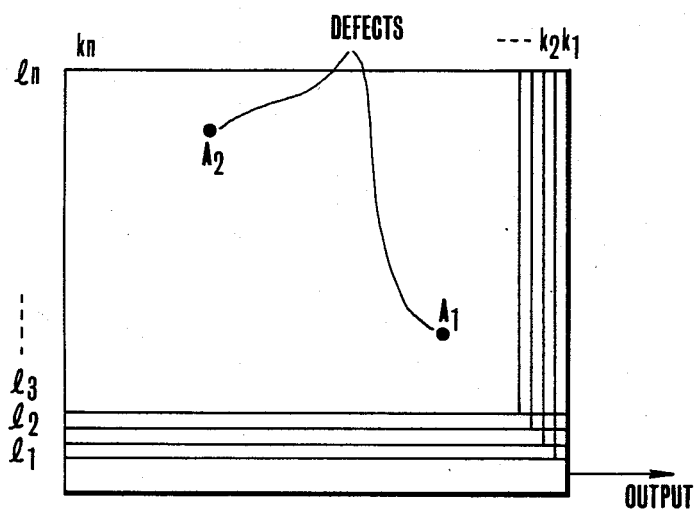
FIGS. 3(a) and 3(b) are illustrations showing addresses arranged on the image plane of a CCD.
Figure 3B:
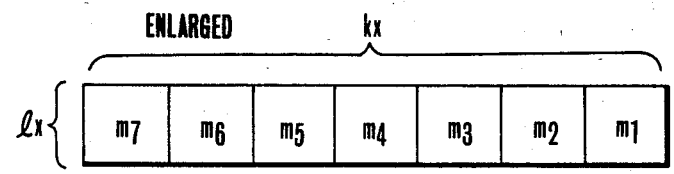

FIG. 2 shows an embodiment of this invention. A control circuit 212 incorporates an EEPROM (electrically erasable programmable read only memory) which is capable of storing the addresses of defects. The control circuit 212 includes a micro-computer such as a product of Motorola, Inc. called MC68HC11A8 or the like. The illustration includes a bus interface circuit 260; a CCD driving circuit 10; an image sensor 3 which is a CCD or the like and hereinafter will be called CCD for short; a signal processing circuit 4; a sample-and-hold circuit 14 which is arranged to sample and hold the output 150 of the CCD 3 in accordance with sample-and-hold pulses 156; and a timing pulse generating circuit 100. The circuit 100 generates timing pulses for controlling the operation of the CCD 3 and is arranged in the same manner as the clock pulse generating circuit 11 of FIG. 1 but does not include the counting part which is arranged within the circuit 11 to count transmitted picture elements. In this case, counters 111, 112 and 113 are arranged to count the transmitted pictured elements during a scanning action on the image sensor or CCD 3. Among these counters, the counter 111 counts the number of horizontal lines ln which are as shown in FIG. 3(a). With the extent of each of the horizontal lines in the horizontal direction divided, for example, into sector units as shown in FIGS. 3(a) and 3(b), the counter 112 counts the sector positions kn and another counter 113 the number of picture elements mn included in each of the sector units.

Shift registers 101 and 104 are arranged to obtain from the control circuit 212 and temporarily store a line lx which has a defect. Shift registers 102 and 105 are arranged to obtain from the control circuit 212 and temporarily store a sector kx which has a defect. Shift registers 103 and 106 are arranged to obtain from the control circuit 212 and temporarily store a cell mx which has a defect. Comparators 108 to 110 are arranged to compare the contents of the shift registers 104 to 106 with the contents of the counters 111 to 113.

A counter 107 is arranged to count the number of pulses produced from an OR gate 120 and, in the case of this embodiment, is arranged to be a 36-adic counter. The levels of signals 154 and 158 become high when the content of the counter 107 becomes "0" and "17" while that of another signal 159 becomes high when the counted value reaches "35". A reference numeral 142 denotes a set-reset flip-flop (hereinafter referred to as SRFF). Numerals 115 to 133 denote logic gate circuits. Numerals 140 and 141 denote D flip-flops (hereinafter referred to as DFFs) which are provided with clear terminals.

The embodiment operates in the following manner: At the control circuit 212, the addresses lx of defective horizontal lines, the addresses kx of defective sectors and the addresses mx of defective cells are assumed to be stored beforehand. Before reading out the signal of the CCD 3 after a power supply to the system is switched on, the control circuit 212 loads the shift registers 101 to 106 with defect position information. For the sake of simplicity, let us here assume that compensation is to be made for defects existing at two points on one image plane, i.e. points A1 and A2 as shown in FIG. 3(a ). Further, the address of each line is assumed to be expressed in 8 bits, that of each sector in 7 bits and that of each cell in 3 bits respectively. Each latch arrangement is assumed to be reset when the system is reset.

First, the control circuit 212 serially sends out, by controlling the bus interface 260, the addresses of existing defects beginning with the least significant bit (LSB) of the cell address. More specifically, while the LSB of the cell address is produced to a signal line 152, a write strobe pulse signal ($\overline{WR}$) 153 is kept at a low level for a given period of time. A shift enable signal 1154 is then at a low level as the system has been reset. Therefore, the above stated address signal passes through the gates 117 and 119 and is latched at the most significant bit (MSB) of the shift register 101. At the same time, the counter 107 counts the pulses produced from the gate 120. The counted value of this counter thus becomes "1". Meanwhile, the level of the output Q of the DFF 140 also becomes high.

In this manner, data consisting of 36 bits, (3 bits+7 bits+8 bits)×2, are sent out one after another. Then, the address data come to be latched at the shift registers 101 to 106. In this instance, with regard to the address data for the two parts in question, the address of the point A1 which is located in the lower part, as viewed on FIG. 3(a ), is transferred before the other. In other words, the address of the point A1 is stored at the registers 104 to 106 and then the address of the other point A2 at the registers 101 to 103.

When 36 write strobe pulses $\overline{WR}$ are counted by the 36-adic counter 107, the counted value of the counter 107 comes back to "0". Then, the level of the decoded output 1540 of the counter 107 becomes high. The DFF 140 is cleared by this. Therefore, the output level of the gate 128 becomes high to enable the comparators 108 to 110. In other words, the comparators 108 to 110 have been in a disabled state until the 36-bit addresses of the two defect points are set at the registers 101 to 106.

With the 36-bit addresses having been transferred in this manner, the image sensing signal of the CCD 3 is read out in the following manner: The timing pulses for reading from the CCD 3 are formed by decoding the contents of the counters 111 to 113. The timing pulses thus obtained are supplied to the CCD driving circuit 10. Therefore, the position of the picture element currently being read out can be known from the contents of the counters 111 to 113. In other words, when the scanning position of the CCD comes to the point A1 after the start of reading, the contents of the counters 111 to 113 come to coincide with those of the registers 104 to 106. This causes the levels of all the inputs to the gate 129 to become high. Therefore, the level of an equal signal from the gate 129 becomes high to make the output level of the gate 132 low. The gate 132 thus does not produce the sample-and-hold pulse signal 156. This means that the signal processing circuit 4 then continuously receives from the sample-and-hold circuit 14 the same signal that represents a picture element located right before the defective picture element. Since adjacent picture elements on the image plane is closely related to each other, the defect existing at this point is substantially corrected. Meanwhile, when the output level of the gate 129 becomes high, the level of a shift-enable signal 1154 which is produced from the SRFF 142 becomes high. The output level of the gate 128 therefore becomes low to disable the comparators 108 to 110. Then, since the write strobe pulse signal 153 still remains at a high level, the output level of the gate 115 becomes high to cause a clock signal 157 to be produced from the gate 120. As a result, in response to every clock pulse, the shift registers 101 to 106 shift their contents by one bit in a cycle. When shifts for 17 bits immediately before 18 bits have been made, the level of a decoded signal 158 of the counter 107 corresponding to a counted value "17" becomes high. The output level of the gate 122 becomes high. When a shift for the 18th bit is caused by a next clock pulse, the SRFF 142 is reset. Then, the level of the shift-enable signal 1154 becomes low to bring the shifting action to a stop. In other words, the address of the defect point A2 which is stored at the shift registers 101 to 103 is set at the shift registers 104 to 106. The output level of the gate 128 then once again becomes high to cause the comparing action to begin for correcting defects in the same manner as in the case of the defect point A1.

Upon completion of the defect correction, the output level of the SRFF 142 again becomes high and the shift registers 101 to 106 resume their shifting. The counter 107 this time up counts from a counted value "18". The level of the signal 159 becomes high when the counted value reaches "35". Then, at a next point of time when the system clock or shifting has made one round, the output level of the SRFF 142 becomes low to disable the shifting operation. Further, the counted value of the counter 107 becomes "00". The shift registers then come back to their original states. Namely, the address of the defect point A2 is stored at the shift registers 104, 105 and 106 while that of the defect point A1 is store at the shift registers 101, 102 and 103 to permit a second round of reading. The ensuing operation requires no reloading of addresses unless the power supply is switched off.

Further, the DFF 141 is provided for the purpose of ensuring that the contents of the shift registers 101 to 106 are normal data at the commencement of reading one field portion of the signal of the CCD 3. More specifically, the DFF 141 is arranged as follows: In the event of incorrect positions of data stored by the shift registers, the counted value of the counter 107 is not "0" when a reading start signal 160 is sent out. While the address of the defect point A2 should be at the shift registers 101 to 103 and that of the defect point A1 at the shift registers 104 to 106, if the address of the defect point A1 is stored in place of that of the defect point A2 or if the bits are dislocated by one bit, for example, the counted value of the counter 107 fails to become "0". In that instance, the level of the output Q of the DFF 141 becomes high upon receipt of the signal 160. Then, since the signal 1154 is not at a high level then, the output level of the gate 126 becomes high to enable shifting to be performed. Therefore, the data position is automatically shifted. When the shift is made for 35 bits corresponding to the counter value of "35", the DFF 141 and the SRFF 142 are reset to bring 36-bit shifting to an end. This makes the output level of the gate 126 low and the shifting action comes to a stop, so that the addresses can be correctly set once again.

Since such a repeated setting action is performed generally at a point of time near the vertical blanking period, it does not show up on a monitor picture plane and thus present no problem. Besides, no defect compensation is necessary during such a period.

While, the embodiment is arranged to have the addresses of two points per image plane stored by the shift registers, the arrangement can be easily changed to cover three of more than three points instead of two. For example, in the event of three points, another set of shift registers which are similar to the shift registers 101 to 103 are added for 18 additional bits. Then, the counter 107 is changed to be a 54-adic (18×3) counter. Meanwhile, the counted value "35" is also decoded and supplied to the input terminal of the gate 122. In that event, the signal 159 is arranged to be produced when the counted value of the counter 107 becomes "53". Further, the number of bits for the horizontal line, the sector and the cell required in expressing the defect address is not limited to the total of 18 bits but may be changed as desired. It is not particularly necessary to divide one line into the sectors and cells for the purpose of indicating the cell position within the line.

In the case of this embodiment of the invention, the defect position indicating addresses are stored at the EEPROM within the control CPU beforehand for the purpose of interpolating for the defective elements. After the start of the system, the addresses stored at the EEPROM are loaded on the shift registers which are arranged within the circuit which generates the timing pulses for driving the CCD. The comparators which are arranged to find whether or not the address of the signal to be transferred is the address of a signal representing a defective picture element by comparing the address with the address stored at the registers are arranged within the timing IC which is provided for driving the CCD. This arrangement enables the embodiment to make compensation for defects without increasing the scale of the circuit arrangement thereof.

The counted value of the counter which is arranged within the timing IC to form clock pulses for driving the image sensor is arranged to be compared directly with the data indicative of the position of the defective picture element. This arrangement obviates the necessity of any additional counter for the comparison and thus contributes to further simplification of the apparatus.

In accordance with this invention, the use of one set of comparators suffices even if the number of defects of the image sensor to be compensated for is increased. Therefore, no increase in the circuit scale results from the increased number of compensable defects. It is another advantage of the invention that the signals of defective picture elements can be smoothly corrected even in the event of a slow operating speed of the micro-computer which is used for control.

What is claimed is:

1. An image sensing apparatus comprising:
   a memory arranged to store defect position data representing the corresponding positions to all defects existing in an image sensor;
   a cyclic register arranged to temporarily store a plurality of defect position data stored by said memory;
   a comparator arranged to compare one defect position data stored by said register with the scanning position of said image sensor; and
   correcting means arranged to correct the output of said image sensor in accordance with the output of said comparator.

2. An apparatus according to claim 1, wherein said memory is an EEPROM.

3. An apparatus according to claim 2, further comprising a CPU arranged to control the operation of each circuit arranged within said image sensing apparatus; and said EEPROM is disposed within said CPU.

4. An apparatus according to claim 1, wherein said correcting means includes a sample-and-hold circuit.

5. An image sensing apparatus comprising:
   (a) image sensing means arranged to convert an optical image into an image signal;
   (b) a signal source arranged to generate timing pulses to be used for controlling the operation of said image sensing means, said signal source not including address generating means for said image sensing means;
   (c) a first memory arranged to store information on the positions of defects existing within said image sensing means;
   (d) a second memory arranged to temporarily keep the information stored by said first memory; and
   (e) correcting means arranged to compare the information kept by said second memory with the output of said signal source and to correct, according to the result of the comparison, said image signal obtained from said image sensing means.

6. An apparatus according to claim 5, wherein said correcting means includes sample-and-hold means.

7. An apparatus according to claim 5, wherein said first memory includes an EEPROM.

8. An apparatus according to claim 5, wherein said second memory includes shift registers.

9. An apparatus according to claim 8, wherein said shift resisters are disposed within said signal source.

10. An apparatus in accordance with claim 5 wherein:
    said signal source includes a counter arranged to generate said timing pulses;
    and said output of said signal source compared by said correcting means with the information kept by said second means is the count of said counter.

* * * * *

UNITED STATES PATENT AND TRADEMARK OFFICE
CERTIFICATE OF CORRECTION

PATENT NO. : 4,893,185
DATED : January 9, 1990
INVENTOR(S) : Nobuo Fukushima, et al.

It is certified that error appears in the above-identified patent and that said Letters Patent is hereby corrected as shown below:

TITLE PAGE:
[54] After "APPARATUS" insert -- WITH CORRECTION FOR IMAGE SENSOR DEFECTS --.

[22] Change "May 13, 1989" to -- May 15, 1989 --.

Col. 2, line 52, change "ln" to -- $\ell n$ --.

Col. 2, line 61, change "lx" to -- $\ell x$ --.

Col. 3, line 14, change "lx" to -- $\ell x$ --.

Col. 4, line 15, change "is" to -- are --.

Col. 5, line 18, change "present" to -- presents --.

Col. 5, line 23, change "of" to -- or --.

Signed and Sealed this

Fourth Day of June, 1991

Attest:

HARRY F. MANBECK, JR.

Attesting Officer     Commissioner of Patents and Trademarks